Nov. 1, 1938.  J. E. RENHOLDT  2,135,470
PAD HOLDING DEVICE
Filed July 18, 1936
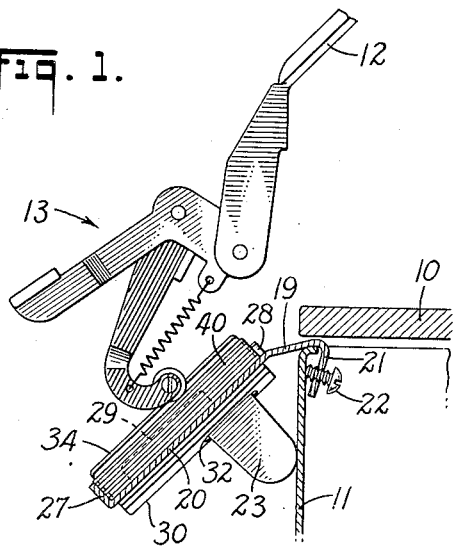
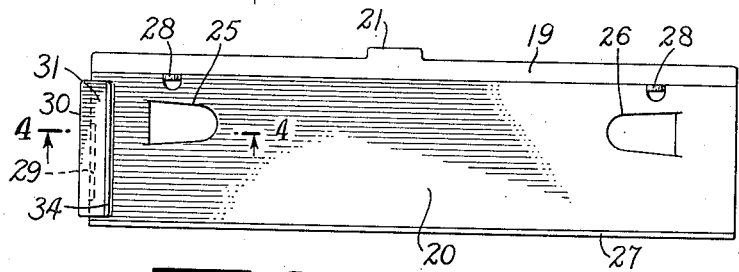
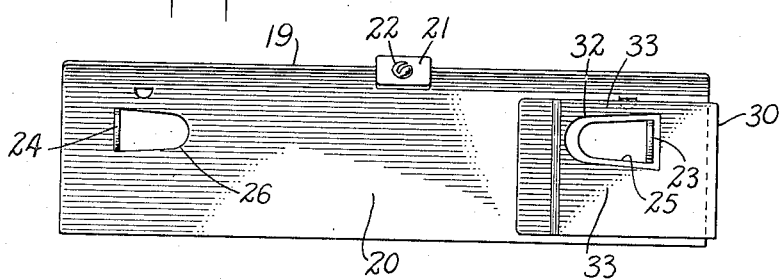
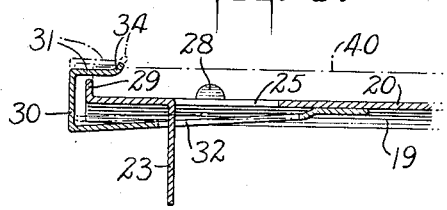
INVENTOR
John E. Renholdt
BY
Blair, Curtis + Dunne
ATTORNEYS Patented Nov. 1, 1938

2,135,470

UNITED STATES PATENT OFFICE 2,135,470

PAD HOLDING DEVICE

John E. Renholdt, Bridgeport, Conn., assignor to Dictaphone Corporation, New York, N. Y., a corporation of New York Application July 18, 1936, Serial No. 91,277

6 Claims. (Cl. 281—44)

This invention relates to memorandum padholding devices for phonographs; and particularly for that type of phonograph which is adapted to commercial use in which is employed a recorded for recording dictation and a reproducer for reproducing dictation. In connection with phonographs of this character, it has been usual to employ memorandum sheets, each sheet having printed thereon a scale corresponding to a scale on the phonograph upon which sheet the dictator may note certain instructions and corrections, this memorandum sheet being turned over to the transcriber as a guide in transcribing the record. Devices for this purpose, heretofore proposed, have consisted of various forms such as that shown in United States Patent Number 2,072,064, issued February 23, 1937.

An object of the present invention is to provide an improved holder for the pad of memorandum sheets. Other objects will be in part obvious and in part pointed out hereinafter.

The invention accordingly consists in the features of construction, a combination of elements, and arrangement of parts, as will be exemplified in the structure to be hereinafter described, and the scope of the application of which will be indicated in the following claims.

In the accompanying drawing, in which is shown one embodiment of the invention:

Figure 1 is a vertical section through the padholding device, showing its relationship with the base of a dictating machine and the marking device;

Figure 2 is a top view of the pad-holding element detached from its usual position on the machine;

Figure 3 is a bottom view of the same; and

Figure 4 is a sectional view on the line 4—4 of Figure 2.

Similar reference characters refer to similar parts throughout the various views of the drawing.

In general, the indication-marking device comprises a support for memorandum sheets, a marking device, and means whereby the marking device and support have relative movement in proportion to the relative movement of the sound box and record tablet. The marking device shown comprises a plurality of marking means adapted alternatively to be operated by the dictator to make relatively distinguishable marks extending transversely of the record sheet to indicate different instructions or suggestions as, for example, a long mark may be employed to mean the beginning and ending of a letter and a short mark may be used to indicate that a correction has been made in dictating. Again, marks of the same length may be differently positioned upon the sheet with reference to a line or scale printed thereon.

It is, therefore, necessary to position the pad of memorandum sheets securely and accurately so that the markings on a given sheet may be properly interpreted when the record corresponding to that sheet is being transcribed.

Only so much of the dictation machine is shown as will serve to make clear the application of the invention thereto.

The base 10 of the machine is supported on a motor box 11 which contains and supports mechanism for recording and reproducing sound. This mechanism includes a sound box carriage which normally moves longitudinally of the record and which carries a bracket 12 upon which is mounted the marking device, generally indicated by the numeral 13.

As best shown in Figure 1, mounted upon box 11 by means of hook portion 21, screw 22 and legs 23 and 24, is tray 20. Hook portion 21 is an extension from angle flange 19, formed at one edge of tray 20. Legs 23 and 24 are formed by depressing the metal from the main portion of tray 20 so as to form holes 25 and 26 (see Figure 4).

Tray 20 is provided on its lower edge (Figure 2) with a side flange 27 and near its upper edge, adjacent the junction line of angle flange 19, with lugs 28. As best shown in Figure 4, at the left end of tray 26 is provided an end flange 29 and clamp 30.

Clamp 30 is spot welded at the right end thereof (Figure 4) to the bottom side of tray 20 and extends around the left end of tray 20, terminating in clamp extension 31. Clamp 30 is made of resilient metal and is free, except at the end where it is spot welded to tray 20, with the result that it may be flexed from its normal position shown in full lines to that shown in dotted lines. Clamp 30 is cut away so as to form a hole 32 directly below and larger than hole 25, hole 32 being large enough to allow leg 23 to extend freely downwardly therethrough. Hole 32 also tends to restrict the flexing of clamp 30 to the area indicated by the numeral 33 at the sides of hole 32. The extreme end of clamp extension 31 is turned upwardly at 34.

When it is desired to place a pad of memorandum sheets 40 (shown in dotted lines in Figure 4) in the pad-holding device, the pad is placed in tray 20 with the end of pad 40 abutting turned-up portion 34 of clamp extension 31. Clamp 30 and pad 40 are now grasped so as to flex clamp 30 to the dotted line position of Figure 4. With the clamp in this position, pad 40 is slipped to the left underneath end 34 of clamp extension 31 into engagement with flange 29. End flange 29 cooperates with side flange 27 and lugs 28 to position pad 40 accurately.

As various embodiments might be made of this invention, and as various changes might be made in the construction herein described, all without departing from the scope of the invention, it is to be understood that all matter herein set forth or shown in the accompanying drawing is to be interpreted as illustrative and not in a limiting sense.

I claim:

1. In apparatus of the class wherein a pad of memorandum sheets is positioned in a tray adjacent a marking device, and wherein said marking device is adapted to move along said pad in a predetermined path, the combination of, a tray comprising a base portion with an end flange-like portion located so that a pad may be accurately positioned by sliding said pad in said tray in a predetermined direction until movement is stopped by said flange-like portion, and a clamping means attached to the under side of said tray and extending over the top of said tray and over, but out of contact with, said flange-like portion, said clamping means being shaped to form a cut-out portion adjacent its point of attachment to said tray and said tray having a supporting leg which extends through said cut-out portion.

2. In apparatus of the class wherein a pad is accurately positioned with respect to a marking device upon a base member and is held in position by a clamping member, the combination of, an elongated base member having flange-like portions on its two sides and one of its ends, said base member being adapted to receive a pad between the flange-like portions along its two sides and a clamping member attached to the under side of said base member having an engaging portion and a substantially U-shaped free end extending around the above-mentioned end of said base member and said end flange-like portion, a portion of said substantially U-shaped free end being resiliently held in a plane slightly above the upper surface of said base member.

3. In apparatus of the class wherein a pad is accurately positioned with respect to a marking device upon a base member and is held in position by a clamping member, the combination of, an elongated base member having flange-like portions on its two sides and one of its ends, said base member being adapted to receive a pad between the flange-like portions along its two sides and a clamping member attached to the under side of said base member having an engaging portion and a substantially U-shaped free end extending around the above-mentioned end of said base member, a portion of said substantially U-shaped free end being resiliently held in a plane slightly above the upper surface of said base member so as to limit the endwise movement of a pad positioned upon said base member, said clamping member having an aperture therein adjacent its attached end and said base member having a supporting leg which extends through said aperture.

4. In apparatus of the class wherein a pad is accurately positioned with respect to a marking device upon a base member and is held in position by a clamping member, the combination of, an elongated base member having a flange-like edge portion at one end thereof, and a clamping member attached at one end to the under side of said base member and having an engaging portion and a substantially U-shaped free end extending around said end of said base member, said clamping member also having a flexing portion adjacent the point of said attachment to said base member, said flexing portion being reduced in cross-section whereby the flexing of said clamping member is concentrated at said flexing portion.

5. In apparatus of the class wherein a pad is accurately positioned upon a base member, the combination of, a thin rigid base member formed to provide a sheet receiving portion having a flat writing surface and with end and side flanges, and a clamping member attached to the under side of said base member having a flexible portion adjacent its point of attachment to said base member and a substantially U-shaped free end extending around the end of said base member and said end flange, a portion of said substantially U-shaped free end being resiliently held in a plane slightly above said flat writing surface of said base member, said clamping member having an engaging portion between its resilient portion and said free end.

6. In apparatus of the class described, the combination of, a pad receiving base member having a flat writing surface with end and side flanges extending upwardly from said surface so that a pad may be accurately positioned by sliding it along said surface toward said end flange, and a clamping member attached to said base member beneath said writing surface and having a free end extending around said end flange and over the end of said writing surface, said clamping member having a resilient portion of reduced cross-sectional area adjacent its point of attachment and having an engaging portion beneath said writing surface between said resilient portion and said free end whereby said clamping member may be engaged and flexed so that said free end is moved away from said writing surface.

JOHN E. RENHOLDT.